United States Patent
Aramatsu

(10) Patent No.: US 7,477,338 B2
(45) Date of Patent: Jan. 13, 2009

(54) LIQUID CRYSTAL DISPLAY

(75) Inventor: Yoshiaki Aramatsu, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 309 days.

(21) Appl. No.: 10/598,605

(22) PCT Filed: Feb. 28, 2005

(86) PCT No.: PCT/JP2005/003330

§ 371 (c)(1), (2), (4) Date: Sep. 5, 2006

(87) PCT Pub. No.: WO2005/085940

PCT Pub. Date: Sep. 15, 2005

(65) Prior Publication Data

US 2007/0188674 A1    Aug. 16, 2007

(30) Foreign Application Priority Data

Mar. 4, 2004    (JP)    ............................. 2004-060963

(51) Int. Cl.
G02F 1/1333    (2006.01)
(52) U.S. Cl. .......................................... 349/58; 349/60
(58) Field of Classification Search .................. 349/58, 349/60
See application file for complete search history.

(56) References Cited

FOREIGN PATENT DOCUMENTS

| JP | 2002-098945 | | 4/2002 |
|---|---|---|---|
| KR | 1020000077415 | A | 12/2000 |
| KR | 1020020060903 | A | 7/2002 |

OTHER PUBLICATIONS

Japanese Patent Office, International Search Report, PCT/JP2005/003330, Apr. 5, 2005, 1 page, Reference to JP2005-98945A.

*Primary Examiner*—David Nelms
*Assistant Examiner*—Phu Vu
(74) *Attorney, Agent, or Firm*—SoCal IP Law Group LLP; Steven C. Sereboff; John E. Gunther

(57) ABSTRACT

A liquid crystal display comprising a liquid crystal panel having a first glass substrate and a second glass substrate provided with a terminal part protruding beyond the first glass substrate; a backlight provided with a light source, a light guide plate and an optical sheet; a case for housing the liquid crystal panel and the backlight; and a double-sided tape for bonding the second glass substrate side of the liquid crystal panel and the case. The double-sided tape is provided at a frame part in the outer circumference of the effective display section of the liquid crystal panel which is closer to the effective display section than the terminal part and where the first and second glass substrates overlap. The double-sided tape is narrower than the width of the frame part where the first and second glass substrates overlap. Consequently, there can be obtained a liquid crystal display having such a structure that the liquid crystal panel is insusceptible to damage when dropped.

4 Claims, 8 Drawing Sheets

LIQUID CRYSTAL DISPLAY

RELATED APPLICATION INFORMATION

This patent claims priority from Japanese Patent Application No. 2004-060963 filed Mar. 4, 2004, and PCT Application No. PCT/JP2005/003330 filed Feb. 28, 2005, both of which are incorporated herein by reference.

TECHNICAL FIELD

The present invention relates to a liquid crystal display that has a bonding member that bonds the liquid crystal panel and the case.

RELATED ART

Liquid crystal displays are now used in numerous and various electrical products, including personal computers, television sets and mobile telephones. Thus there is high probability of their being damaged due to dropping, particularly in mobile telephones and other products that are carried about.

In Patent Document 1 (JP-A-2003-114417) there is disclosed a liquid crystal display in which a rim-like protective device is fitted at the periphery of a plate-like frontlight; and the frontlight, once installed to such protective device, is mounted on the liquid crystal panel's surface, which is planar. The liquid crystal panel is bonded to the cell case with double-sided tape. This is a common means of securing the liquid crystal panel to the case.

FIG. 6 is a top view showing a liquid crystal panel and double-sided tape commonly used in mobile telephones. FIG. 7 is a side view of the liquid crystal panel, double-sided tape, and case. Only the two glass substrates of the liquid crystal panel are shown in the drawings, the other structural elements being omitted for the sake of convenience. The liquid crystal panel 30 has a first glass substrate 31 of the color filter (CF) side and a second glass substrate 32 of the TFT side. The liquid crystal panel 30 may be divided into: an effective display section 30a which is the area where display is possible, a frame part 30b that surrounds the effective display section 30a, and a terminal part 32a which is on the outside of the frame part 30b and on which terminals 35 are gathered. The second glass substrate 32 and the case 34 are bonded with double-sided tape 33. The double-sided tape 33 is provided at the frame part 30b and the terminal part 32a.

Patent Document 1 JP-A-2003-114417

DISCLOSURE OF THE INVENTION

Problems to Be Solved by the Invention

As FIGS. 6 and 7 show, the second glass substrate 32 is larger than the first glass substrate 31, and the terminal part 32a is constituted solely from the second glass substrate 32. The double-sided tape 33 is applied to this portion constituted solely from the liquid crystal panel 30's second glass substrate 32. Hence if the device is dropped and the case 34 flexes, concomitantly the terminal part 32a also will flex, and cracks will occur in the terminal part 32a.

FIG. 8 is a top view of a liquid crystal panel and double-sided tape used in a personal computer's display. The difference from the liquid crystal panel in FIG. 6 is that the terminal part 42a is formed into an L-shape. As above, the terminal part 42a is constituted solely from the second glass substrate 42, and the double-sided tape 43 is applied to such portion. Hence if the device is dropped, such portion constituted solely from the second glass substrate 42 will be most susceptible to damage.

As liquid crystal displays are being required to be flatter, there is a trend for thin cases to be used. The thinner the case is, the more susceptible will be the case itself to flexing, and therefore the higher will be the probability of the liquid crystal display panel being damaged should the device be dropped.

There is also a tendency for the liquid crystal panel itself to be rendered thinner. As a specific example: the thickness of the glass substrates in a 2-inch (5.08 cm) diagonal size liquid crystal panel used to be 1.2 mm, whereas in recent years it has become thinner at 0.8 mm to 1.0 mm. Since thinner glass substrates inevitably mean that the liquid crystal panel itself will be more liable to flex, there is increased hazard of damage to the liquid crystal panel or cracking of the terminal part.

Accordingly, the purpose of the present invention is to provide a liquid crystal display that has such a structure that the liquid crystal panel will not be susceptible to damage if dropped.

Means to Solve the Problems

In order to achieve the aforementioned purpose, the present invention is a liquid crystal display equipped with: a liquid crystal panel that has a first glass substrate and a second glass substrate that has a terminal part that protrudes beyond the first glass substrate; a backlight provided with a light source, a light guide plate and an optical sheet; a case that houses the liquid crystal panel and the backlight; and a bonding member that bonds the liquid crystal panel's second glass substrate and the case; and having the features that: the bonding member is at the periphery of the liquid crystal panel's effective display section, and, at the second glass substrate protrusion portion near the terminal part, is provided within a range from roughly the halfway point of the terminals' length to the effective display section, moreover, the length of the bonding member is narrower than the frame part of the area where the first and second glass substrates are overlapped.

The present invention may also be a liquid crystal display equipped with: a liquid crystal panel that has a first glass substrate and a second glass substrate that has a terminal part that protrudes beyond the first glass substrate; a backlight provided with a light source, a light guide plate and an optical sheet; a case that houses the liquid crystal panel and the backlight; and a bonding member that bonds the liquid crystal panel's second glass substrate and the case; and having the features that: the bonding member is at the periphery of the liquid crystal panel's effective display section, and is provided at the frame part of the area where the first and second glass substrates are overlapped, moreover, the length of the bonding member is narrower than the frame part.

In the above liquid crystal displays, strip-shaped or rim-shaped double-sided tape can be used for the bonding member.

Effects of the Invention

According to the present invention, a gap equal to the thickness of the bonding member arises between part of the second glass substrate and the case. As a result, should the mobile telephone or other device in which the liquid crystal display is installed be dropped, the shock propagating through the case to the liquid crystal panel will be concentrated in the bonding member portions, and therefore will be unlikely to propagate to the terminal part, where the first and second glass substrates are not overlapped. Further, even if the case becomes bent, pressure will be unlikely to act on the terminal part because there is a gap between the terminal part and the case. Hence, damage to the terminal part due to external forces can be prevented.

Moreover, the fact that the bonding member is at the periphery of the effective display section, and, at the second glass substrate protrusion portion near the terminal part, is provided within a range from roughly the halfway point of the terminals' length to the effective display section, or in other words, the fact that the bonding member is kept distant from the outer edge of the second glass substrate at the terminal part, also has the effect of preventing damage to the terminal part, in a similar manner to the foregoing.

Furthermore, regarding the light guide plate and optical sheet 18, it is possible to use an optical sheet that is larger than the effective display area, and thereby to prevent the occurrence of display irregularity should the optical sheet be displaced slightly out of position due to external factors, etc.

DESCRIPTION OF REFERENCE NUMERALS

| | |
|---|---|
| 1 | Liquid crystal display |
| 10, 20, 30, 40 | Liquid crystal panel |
| 10a, 20a, 30a, 40a | Effective display section |
| 10b, 20b, 30b, 40b | Frame part |
| 11, 21, 31, 41 | First glass substrate |
| 12, 22, 32, 42 | Second glass substrate |
| 12a, 22a, 32a, 42a | Terminal part |
| 13, 23, 33, 43 | Double-sided tape |
| 14, 34 | Case |
| 15 | Backlight |
| 16 | LED |
| 17 | Light guide plate |
| 18 | Optical sheet |

BEST MODE FOR CARRYING OUT THE INVENTION

Figure 1:
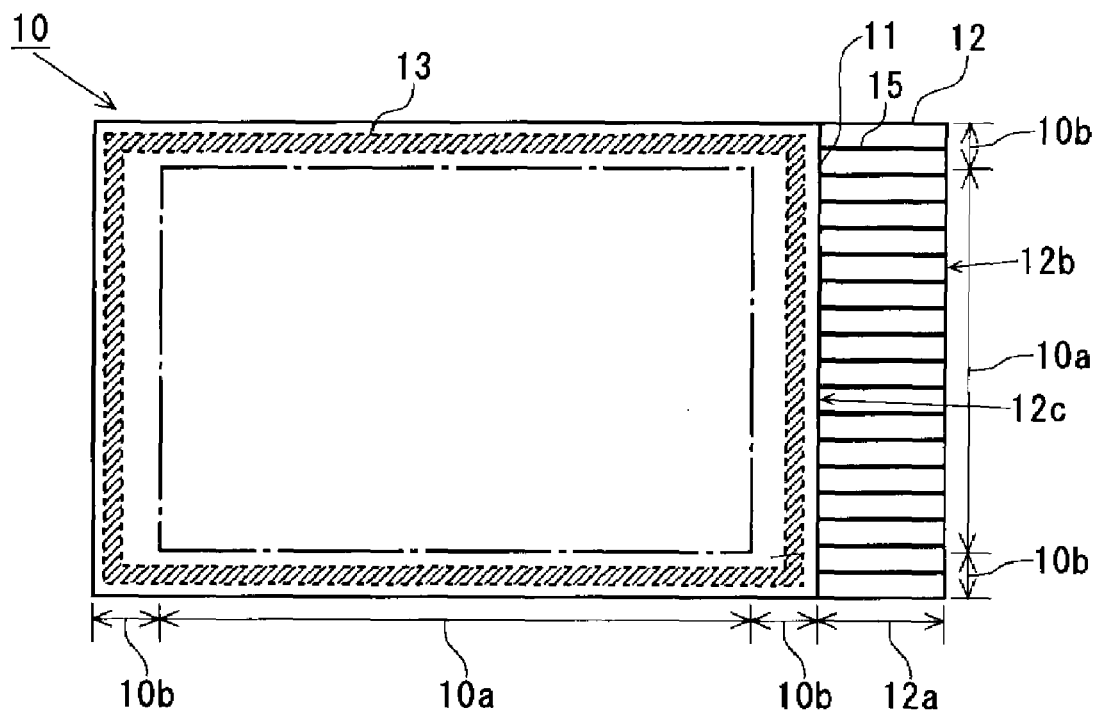
FIG. 1 is a top view of a liquid crystal panel and double-sided tape of the present invention.
Figure 2:
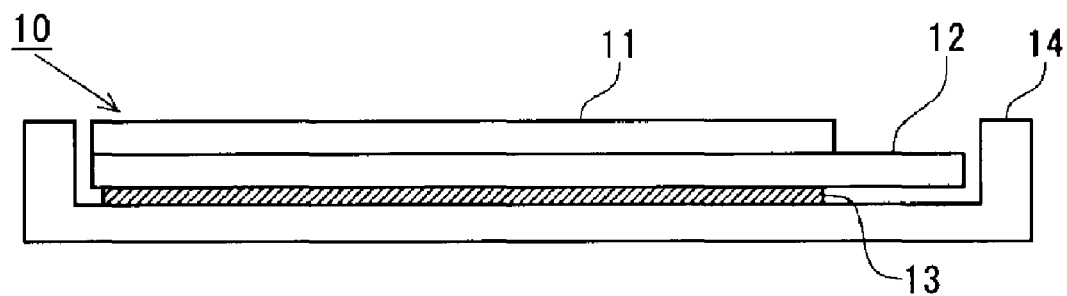
FIG. 2 is a side view of a liquid crystal panel, double-sided tape, and case of the present invention.

A liquid crystal display 1 of the present invention will now be described. FIG. 1 is a top view of a liquid crystal panel and double-sided tape of the present invention, while FIG. 2 is a side view of a liquid crystal panel, double-sided tape, and case of the present invention. Only the two glass substrates of the liquid crystal panel are shown in the drawings, the other structural elements being omitted for the sake of convenience. The liquid crystal panel 10 has a first glass substrate 11 of the color filter (CF) side and a second glass substrate 12 of the TFT side. The second glass substrate 12 is larger than the first glass substrate 11 along one side.

The liquid crystal panel 10 may be divided into: an effective display section 10a which is the area where display is possible, a frame part 10b that surrounds the effective display section 10a, and a terminal part 12a which is on the outside of the frame part 10b and on which terminals 15 are gathered. "Terminal part 12a" refers to the portion of the second glass substrate 12 that is not overlapped with the first glass substrate 11.

As FIG. 2 shows, the liquid crystal panel 10 is bonded to a case 14. More specifically, the second glass substrate 12 and the case 14 are bonded with double-sided tape 13. This double-sided tape 13 is strip-shaped and is provided along the frame part 10b. Further, the double-sided tape 13 is preferably narrower than the frame part 10b.

Owing to such structure, a gap equal to the thickness of the double-sided tape 13 arises between the second glass substrate 12's terminal part 12a and the case 14. As a result, should the mobile telephone or other device in which the liquid crystal display is installed be dropped, the shock propagating through the case 14 to the liquid crystal panel 10 will be concentrated in the double-sided tape 13 portions, and therefore will be unlikely to propagate to the terminal part 12a. Further, even if the case 14 becomes bent, pressure will be unlikely to act on the terminal part 12a because there is a gap between the terminal part 12a and the case 14. Hence, damage to the terminal part 12a due to external forces can be prevented.

Further, the double-sided tape 13 is at the periphery of the effective display section 10a, and, at the second glass substrate protrusion portion near the terminal part 12a, can be provided within a range from roughly the halfway point of the length of the terminals 15 to the effective display section 10a. Thus the double-sided tape 13 is kept distant from the outer edge 12b of the terminal part 12a, and this too has the effect of preventing damage to the terminal part 12a, in a similar manner to the foregoing.

Moreover, even if lead wires from the effective display section 10a, and/or integrated circuits, are deployed on the second glass substrate 12's protrusion portion corresponding to the terminal part 12a in FIG. 1, the terminal part 12a must be of a certain dimension in the direction of protrusion in order to maintain the connection strength and electrical resistance for connection of a flexible sheet, etc., to the terminal part 12a, and to achieve this, the double sided tape should as a rule be positioned roughly halfway along the terminal part 12a's protrusion-direction dimension. If the area occupied by the lead wires and/or integrated circuits is considerably large, the double-sided tape 13 should be positioned closer to the effective display section 10a than to the halfway point on the second glass substrate 12's protrusion portion corresponding to the terminal part 12a in FIG. 1. In other words, the major content of the present invention is that at the protrusion portion of the second glass substrate 12, at least the outer half, approximately, of the terminal part 12a is a free end.

Figure 3:
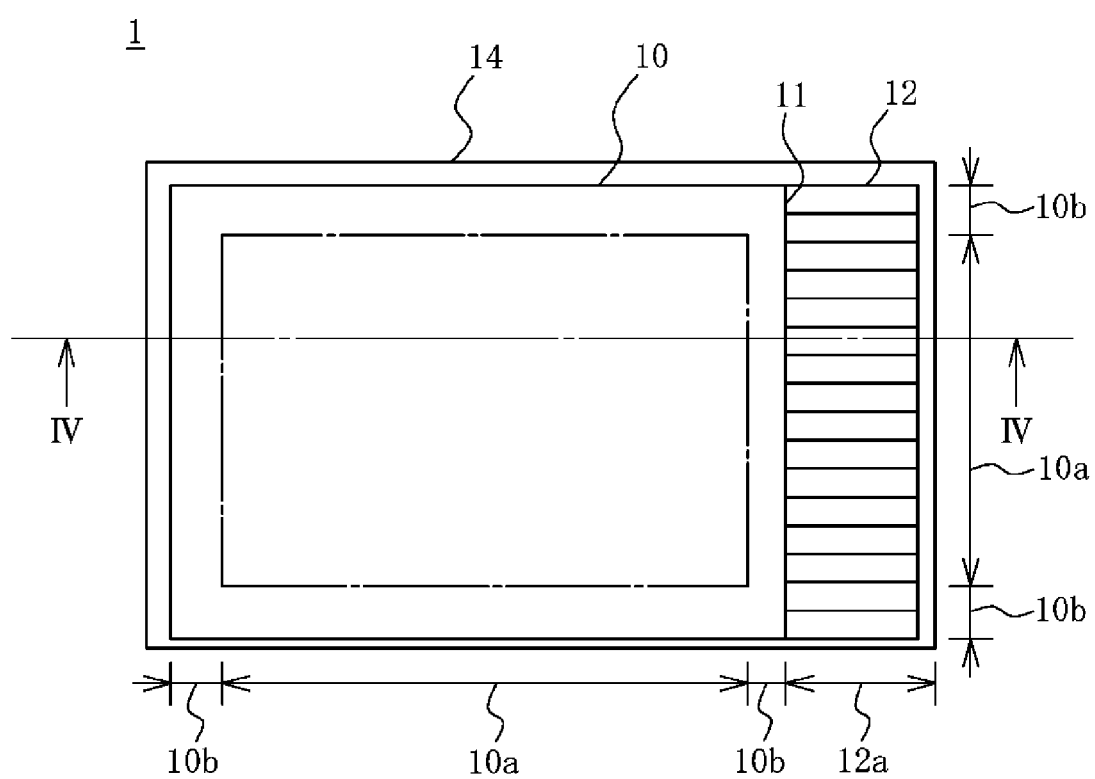
FIG. 3 is a top view illustrating a liquid crystal display of the present invention.
Figure 4:
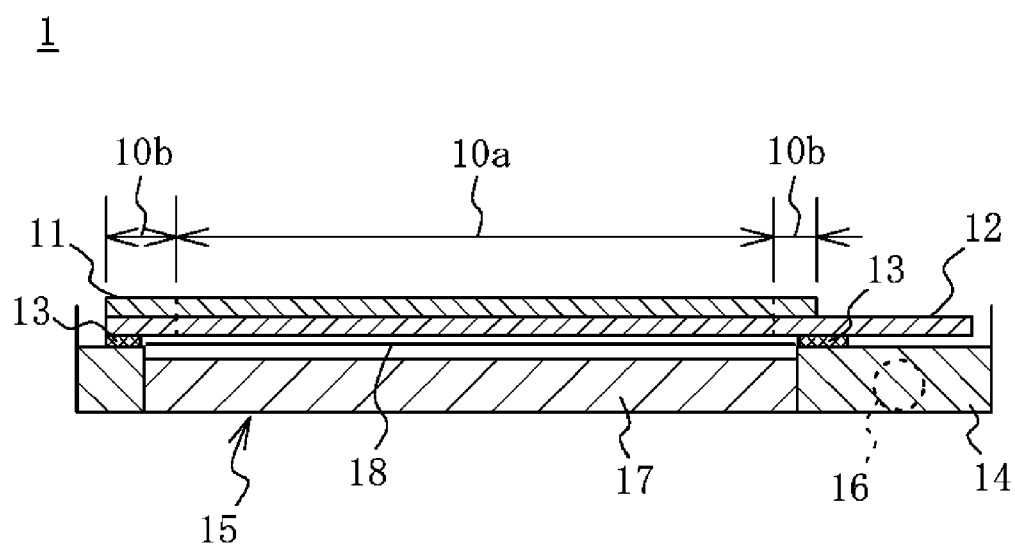
FIG. 4 is a cross-sectional view along line IV-IV in FIG. 3.

Next will be described the state where the foregoing liquid crystal panel 10 is integrated with a backlight 15 so as to constitute a liquid crystal display 1. FIG. 3 is a top view illustrating a liquid crystal display of the present invention, while FIG. 4 is a cross-sectional view along line IV-IV in FIG. 3. A description of the liquid crystal panel 10 is omitted here since it is of the same structure as described above.

As FIGS. 3 and 4 show, the liquid crystal display 1 is composed of a liquid crystal panel 10, a case 14 and a backlight 15. The backlight 15 is composed of: point light sources constituted of LEDs 16 as a light source; a light guide plate 17 for shining the light emitted from the LEDs 16 toward the liquid crystal panel 10; a diffusion sheet that is placed over the light guide plate 17; and one or plural optical sheets 18 constituted of prism sheets or similar. The case 14 houses the backlight 15 and liquid crystal panel 10, or more specifically, houses the backlight 15 in the lower part and the liquid crystal panel 10 in the upper part.

Between the cover 14 and the liquid crystal panel 10, the double-sided tape 13 is applied along the frame part 10b of the liquid crystal panel. As shown in FIG. 4, the double-sided tape 13 is applied in a position a certain distance away from the effective display section 10a of the liquid crystal panel 10, and is narrower than the frame part 10b. Moreover, on the second glass substrate 12 at the end where the terminal part 12a is formed, the double-sided tape 13 is applied so as to extend over positions where the first glass substrate 11 and second glass substrate 12 are overlapped and over positions where they are not overlapped. Thanks to this, damage to the terminal part due to external forces can be prevented. Also, display irregularity in the effective display area due to blockage by the double-sided tape 13 of light shone from the light guide plate 17 located below the liquid crystal panel 10 can be prevented. In addition, since the size of the optical sheet 18 placed over the light guide plate 17 will not be restricted by the double-sided tape 13, the optical sheet 18 used can be larger than the effective display section 10a, and hence even if a slight positional displacement occurs in the optical sheet 18, no display irregularity will result.

Figure 5:
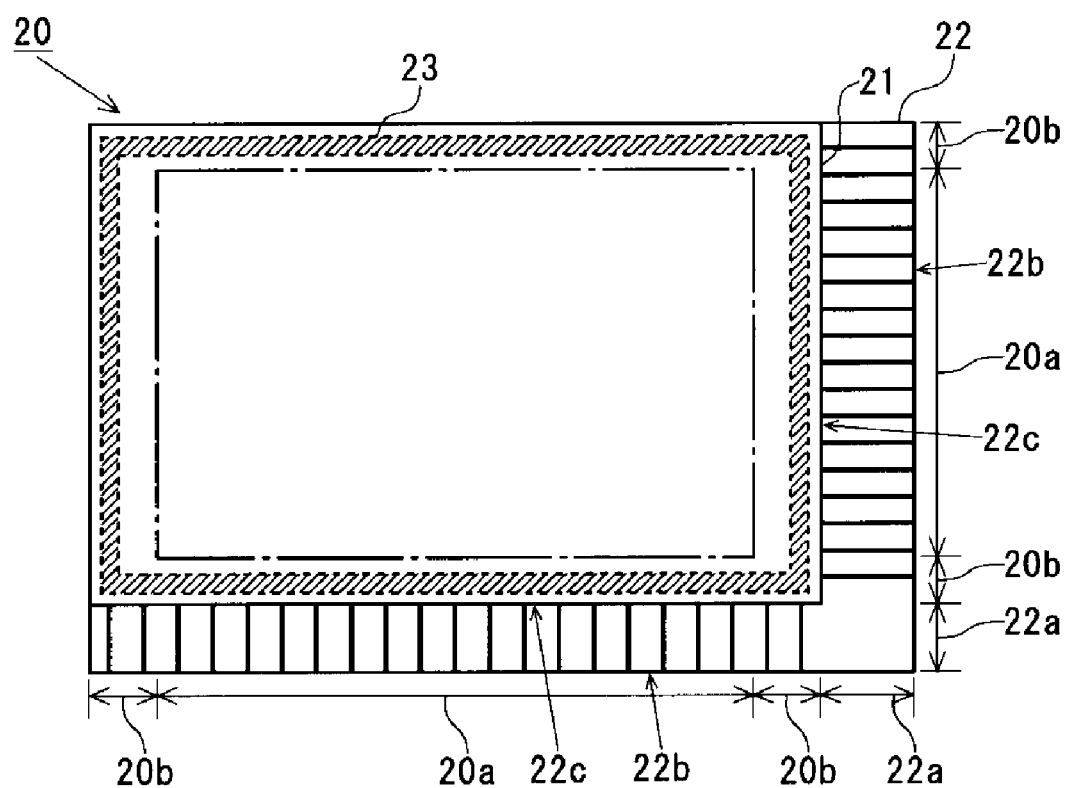
FIG. 5 is a top view of another liquid crystal panel and double-sided tape of the present invention.
Figure 6:
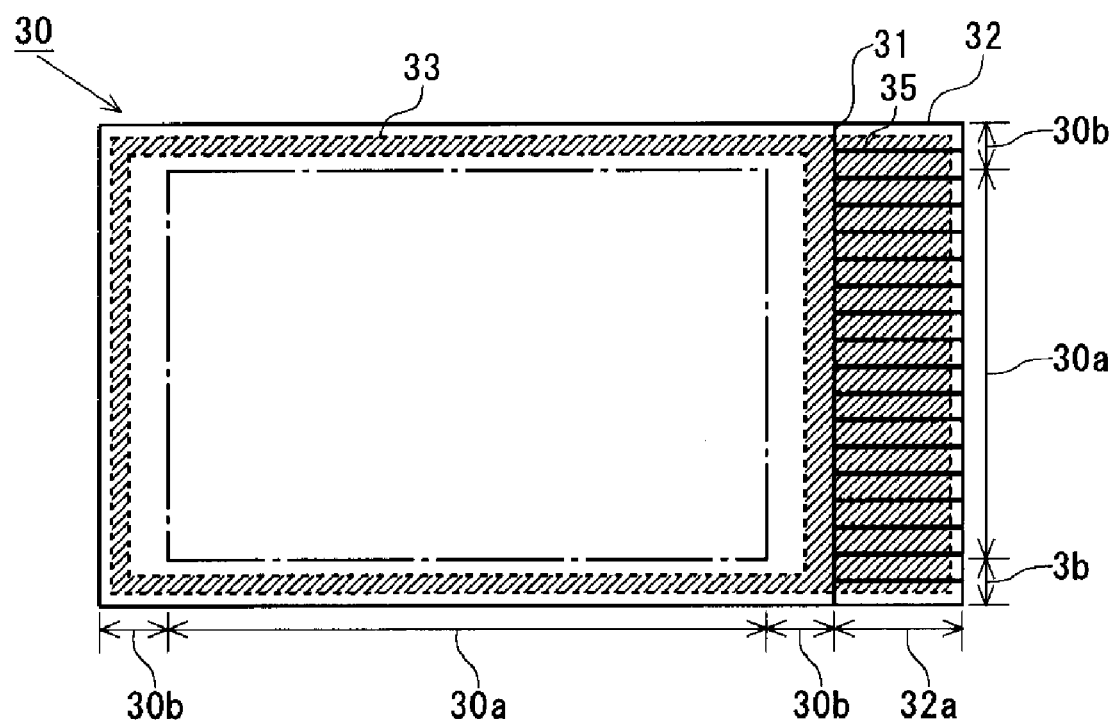
FIG. 6 is a top view of a liquid crystal panel and double-sided tape used in a related art mobile telephone.
Figure 7:
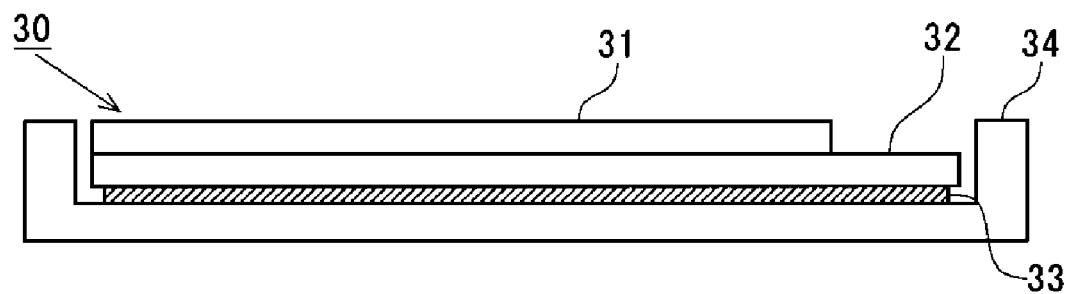
FIG. 7 is a side view of a related art liquid crystal panel, double-sided tape, and case.
Figure 8:
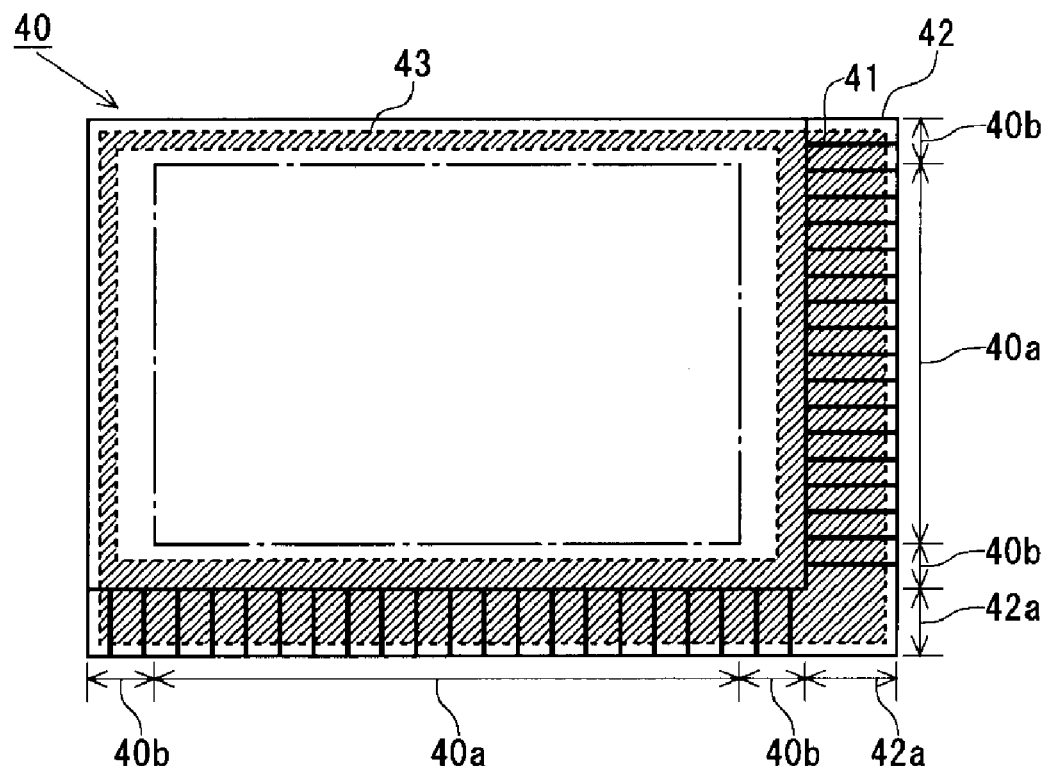
FIG. 8 is a top view of a liquid crystal panel and double-sided tape used in the display of a related art personal computer.

FIG. 5 is a top view of another liquid crystal panel and double-sided tape of the present invention. Like liquid crystal panel 10 above, this liquid crystal panel 20 may be divided into an effective display section 20a, a frame part 20b, and a terminal part 22a. The difference from liquid crystal panel 10 of FIG. 10 is that the terminal part (portion of the second glass substrate 22 that is not overlapped with the first glass substrate 21) 22a is formed into an L-shape. Thus, the second glass substrate 22 is larger than the first glass substrate 21 along two sides.

Bonding of the liquid crystal panel 20 and the case (not shown in the drawing) is effected by bonding the second glass substrate 22 and the case with double-sided tape 23. The double-sided tape 23 is strip-shaped and is provided along the frame part 20b in a rim-like manner.

Owing to such structure, a gap equal to the thickness of the double-sided tape 23 arises between the terminal part 22a of the second glass substrate 22 and the case, in the same way as in liquid crystal panel 10 above. As a result, should the television set or other device in which the liquid crystal display is installed be dropped, the shock propagating through the case to the liquid crystal panel 20 will be concentrated in the double-sided tape 23 portions, and therefore will be unlikely to propagate to the terminal part 22a. Further, even if the case becomes bent, pressure will be unlikely to act on the terminal part 22a because there is a gap between the terminal part 22a and the case. Hence, damage to the terminal part 22a due to external forces can be prevented. Further, in liquid crystal panel 20, since as shown in FIGS. 3 and 4 the double-sided tape 23 is narrower than the frame part 20b and is applied to the frame part 20b in a position a certain distance away from the effective display section 20a, there will be no blockage by the double-sided tape 23 of light shone from the light guide plate, and since the optical sheet can be made larger than the effective display section 20a, display irregularity can be prevented.

The double-sided tape 23 is at the periphery of the effective display section 20a, and, at the second glass substrate protrusion portion near the terminal part 22a, can be provided within a range from roughly the halfway point of the terminals' length to the effective display section 20a. The fact that in this way the double-sided tape 23 is kept distant from the outer edge 22b of the terminal part 22a also has the effect of preventing damage to the terminal part 22a, in a similar manner to the foregoing.

In the foregoing embodiment the double-sided tape is applied to the second glass substrate, but alternatively a sheet such as polarizing plate could as appropriate be interposed between the second glass substrate and the double-sided tape.

The means for bonding the liquid crystal panel 10, 20 and case 14 in the present invention is not limited to the double-sided tape 13, 23; an adhesive agent or bonding member could be used instead.

INDUSTRIAL APPLICABILITY

The liquid crystal display of the present invention will exert a large beneficial effect when applied in personal computers, television sets, mobile telephones and so forth. The liquid crystal panel will be particularly beneficial when applied in compact displays no more than 3 inches in size.

It is claimed:

1. A liquid crystal display comprising:
   a liquid crystal panel having a first glass substrate and a second glass substrate that has a terminal part that protrudes beyond the first glass substrate;
   a backlight provided with a light source, a light guide plate and an optical sheet;
   a case that houses said liquid crystal panel and backlight; and
   a bonding member that bonds said liquid crystal panel's second glass substrate and said case;
   said bonding member being at the periphery of said liquid crystal panel's effective display section, and, at the second glass substrate protrusion portion near the terminal part, being provided within a range from roughly the halfway point of the terminals' length to the effective display section, and moreover, the length of the bonding member is narrower than the frame part of the area where said first and second glass substrates are overlapped.

2. The liquid crystal display according to claim 1, wherein said bonding member is strip-shaped or rim-shaped double-sided tape.

3. A liquid crystal display comprising:
   a liquid crystal panel that has a first glass substrate and a second glass substrate that has a terminal part that protrudes beyond the first glass substrate;
   a backlight provided with a light source, a light guide plate and an optical sheet;
   a case that houses said liquid crystal panel and backlight; and
   a bonding member that bonds said liquid crystal panel's second glass substrate and said case;
   said bonding member being at the periphery of said liquid crystal panel's effective display section, being provided at the frame part of the area where said first and second glass substrates are overlapped, and moreover, length of the bonding member is narrower than said frame part.

4. The liquid crystal display according to claim 3, wherein said bonding member is strip-shaped or rim-shaped double-sided tape.

* * * * *